C. D. WRIGHT.
AUTOMOBILE POWER TRANSMITTING APPARATUS.
APPLICATION FILED JULY 3, 1916.
1,230,259.
Patented June 19, 1917.
3 SHEETS—SHEET 3.
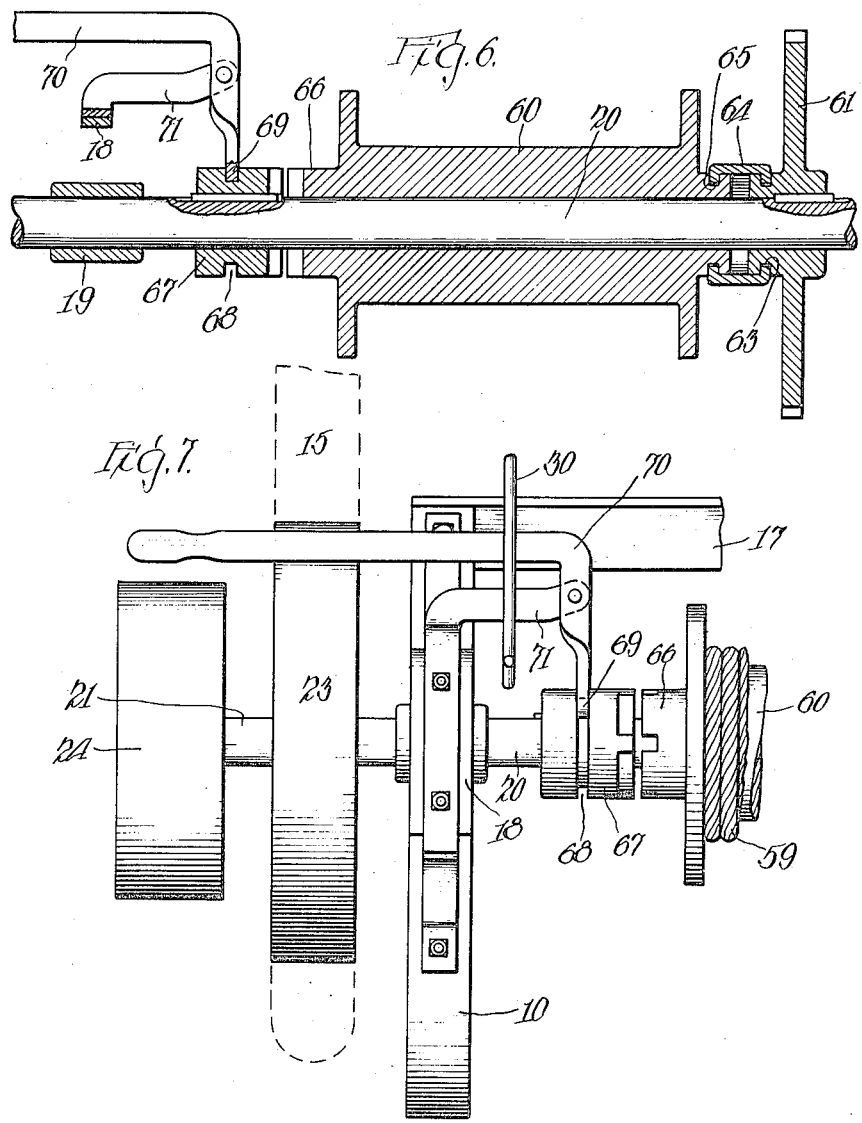
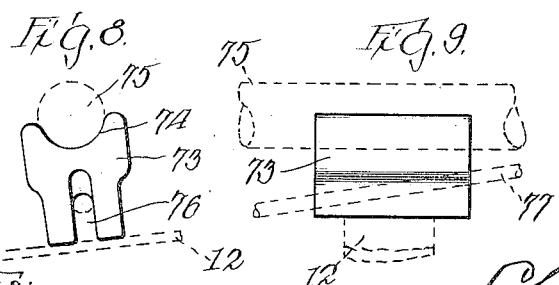

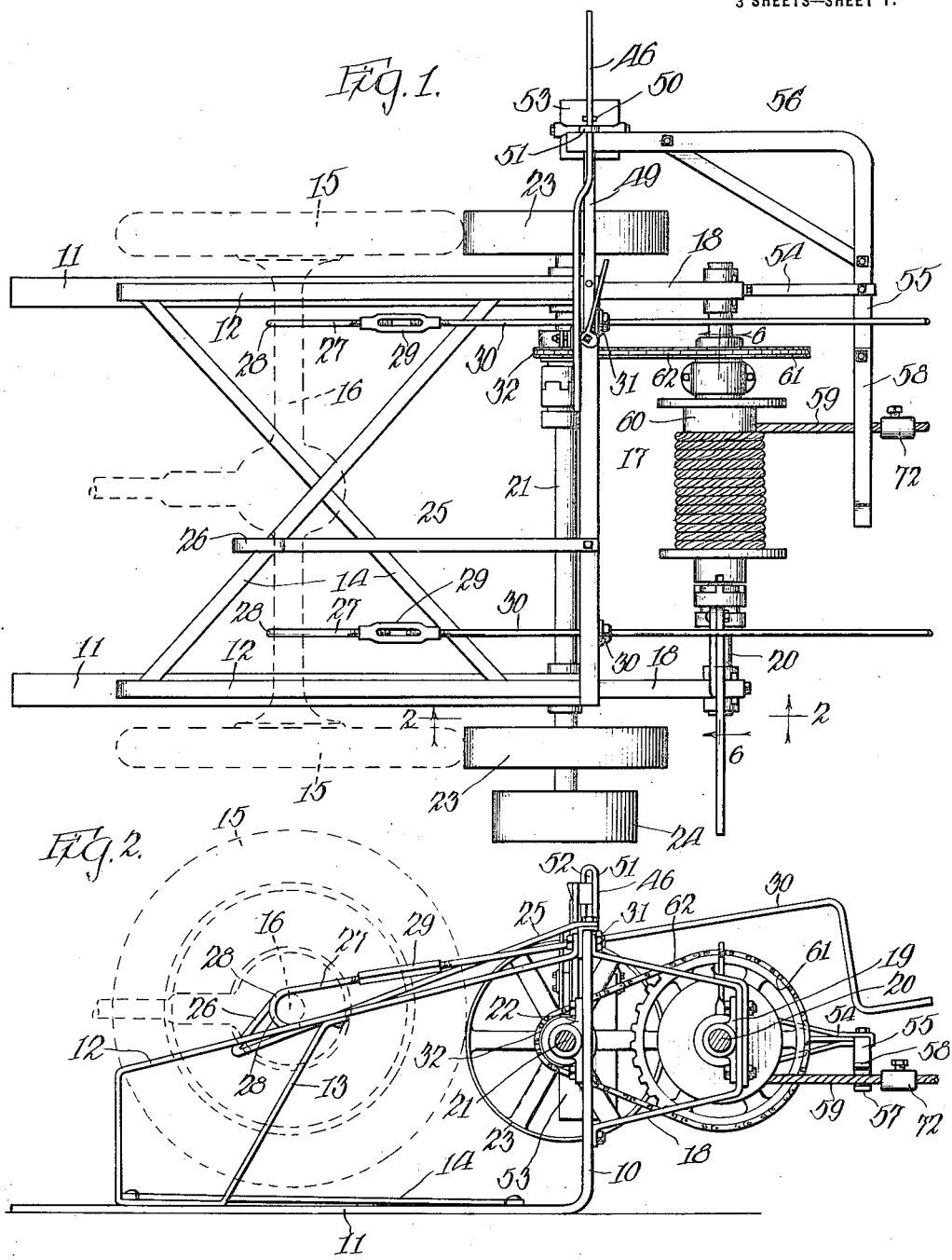

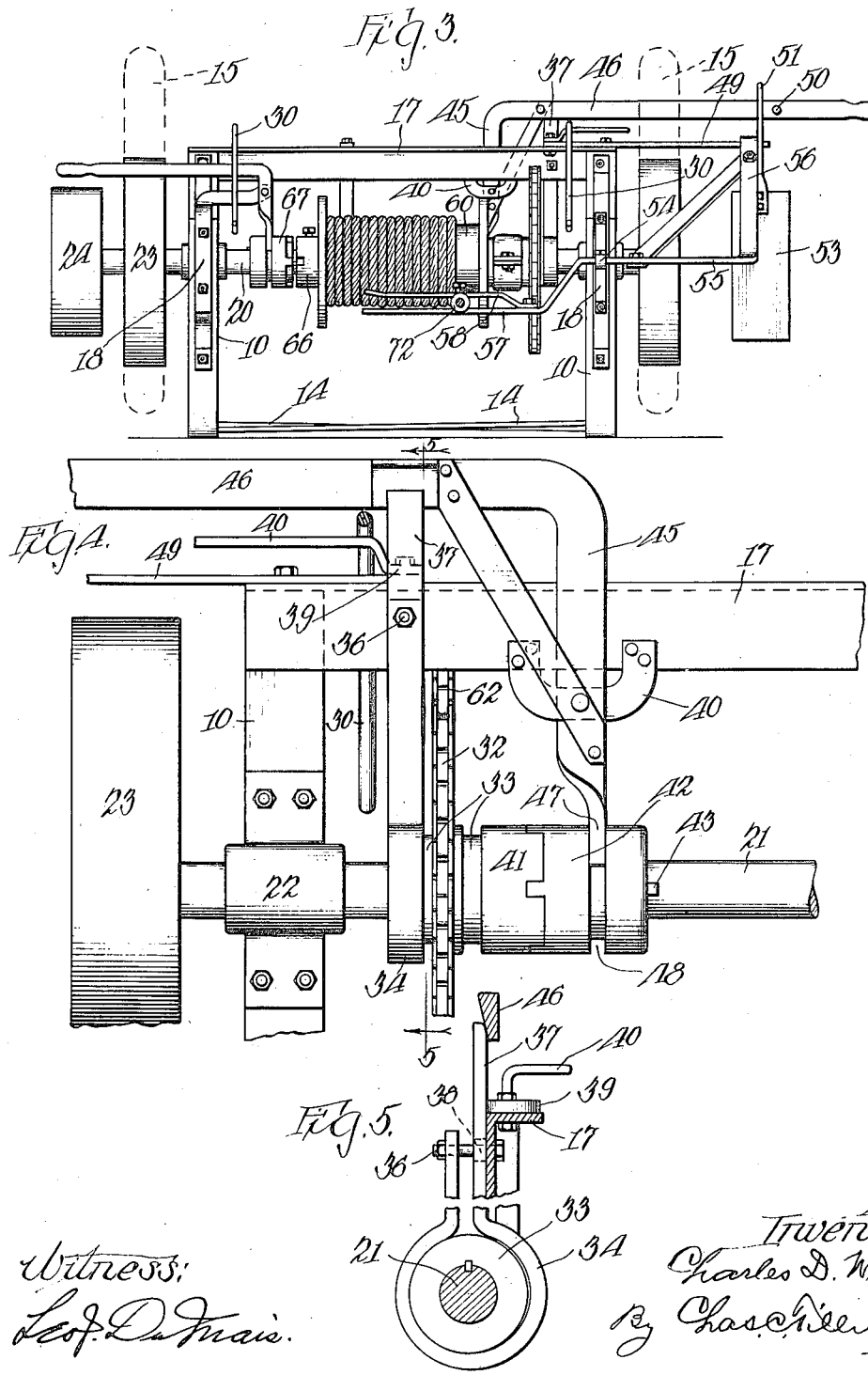

UNITED STATES PATENT OFFICE.

CHARLES D. WRIGHT, OF TOLEDO, OHIO.

AUTOMOBILE-POWER-TRANSMITTING APPARATUS.

1,230,259. Specification of Letters Patent. Patented June 19, 1917.

Application filed July 3, 1916. Serial No. 107,260.

*To all whom it may concern:*

Be it known that I, CHARLES D. WRIGHT, of the city of Toledo, in the county of Lucas and State of Ohio, have invented certain new and useful Improvements in Automobile - Power - Transmitting Apparatus, of which the following is a specification.

This invention relates to improvements in an apparatus or mechanism to be used in connection with an automobile, or motor-driven vehicle, for the purpose of transmitting and controlling power from the rear or driving wheels thereof to machines of various kinds, particulalry those used by farmers, for operating the same, and it consists in certain peculiarities of the construction, novel arrangement and operation of the various parts thereof as will be hereinafter more fully set forth and specifically claimed.

The principal object of the present invention is, to provide an apparatus of the above mentioned general character for imparting power to a windlass or drum, to be used for hoisting any kind of material, such as hay, grain, and the like, from the ground or a wagon to a suitable or desired elevation or place, where it can be deposited, or if desired, for transmitting power to other kinds of machines while the drum may remain idle. Other objects and advantages of the invention will be disclosed in the subjoined description and explanation.

In the accompanying drawings, which serve to illustrate an embodiment of the invention—

Figure 1 is a plan view of the apparatus, showing by dotted lines, the rear or driving axle of an automobile or motor vehicle in position on the supporting frame therefor of the apparatus, and the wheels on said axle in contact with pulleys or wheels on the driving shaft of the apparatus, and illustrating the cable as being almost wound up on the windlass or drum and the parts in their operative positions.

Fig. 2 is a view partly in section and partly in elevation taken on line 2—2 of Fig. 1 looking in the direction indicated by the arrows.

Fig. 3 is a rear end view of the apparatus showing the parts in the positions occupied as shown in Fig. 1 of the drawings.

Fig. 4 is an enlarged front view in elevation of a portion of the supporting frame and a part of the driving shaft of the apparatus, showing an improved clutch and brake mechanism thereon, for use in throwing said shaft into and out of operative connection with the driven or windlass shaft, and for applying a brake to said driving shaft.

Fig. 5 is a cross sectional view taken on line 5—5 of Fig. 4, looking in the direction indicated by the arrows.

Fig. 6 is a longitudinal sectional view taken on line 6—6 of Fig. 1, looking in the direction indicated by the arrows.

Fig. 7 is an enlarged view in elevation, of a portion of the supporting frame and a part of the windlass shaft showing means for placing the windlass in operative position thereon.

Fig. 8 is an end view of a block used on automobiles which have truss rods on their rear axles and Fig. 9 is a view in side elevation thereof, showing by dotted lines the position the parts will assume when located on the supporting frame of the apparatus.

Like numerals of reference refer to corresponding parts throughout the different views of the drawings.

The main or supporting frame of the apparatus consists of two upright side pieces, each of which is designated as a whole by the reference numeral 10, and each of said side pieces has a horizontally extended portion 11 adapted to rest on the ground or floor, as is clearly shown in Figs. 1 and 2 of the drawings. Extended forwardly from the upper portion of each of the upright side pieces 10 of the supporting frame is a downwardly inclined bar 12 which is bent at its front portion downwardly and rests at its lower end on the front portion of each of the parts 11, and then is extended upwardly as at 13 and secured to the bar 12 near its middle portion to form a strong brace therefor. The horizontal portions 11 of the side pieces of the frame, are braced by diagonally disposed bars 14, as is clearly shown in Fig. 1 of the drawings. The side pieces 10 are spaced apart a sufficient distance to allow the inclined bars 12, extended forwardly therefrom, to readily pass between the rear wheels 15, on the driving or rear axle 16 of the automobile or motor-vehicle, and said upright portions are connected together at their upper ends by a horizontal bar or member 17, which is preferably made of angle iron, as is clearly shown in Figs. 3 and 5 of the drawings. Extended rearwardly from each of the upright end pieces 10 is a bracket 18, on the rear portion of each of which is secured a bearing or journal-box 19, in which is journaled a shaft 20, which is located horizontally and in parallelism with the driving shaft 21 of the apparatus, which driving shaft is journaled in suitable bearings 22, one of which is mounted on each of the upright portions 10 of the main frame, at a suitable distance from the base of said frame. The driving shaft 21 has near each of its ends a fixed pulley 23 mounted thereon, and near one of said pulleys another pulley 24, to which a belt may be applied for transmitting power from the driving shaft 21 to any suitable machine or part to be driven thereby, not shown. Extended forwardly from the horizontal bar 17 and downwardly deflected is a resilient arm 25, which has at its front portion an upwardly and rearwardly inclined hook or catch 26, which is designed to be depressed as the axle 16 of the motor-vehicle comes in contact therewith in its rearward movement on the inclined bars 12, until after the said axle passes over the upper portion of said hook, when it is apparent the resiliency of the arm 25 will cause the hook 26 to be raised and automatically engage the axle of the vehicle, so as to hold its wheels 15 in contact with the fixed pulleys 23 on the driving shaft of the apparatus. As a further means for securing the rear axle 16 in the proper position on the inclined rails or bars 12 of the supporting frame, a rod 27, having at its front end a hook 28 is located near the inner surface of each of the rails or bars 12, so that the hooks may be caused to engage the axle when desired. Each of the rods 27 has its rear portion screw-threaded and extended rearwardly, and is connected by means of a turn-buckle 29 to the screw-threaded front end of a crank handle rod 30, each of which is extended through a suitable collar 31, mounted on the rail or bar 17, as will be readily understood by reference to the drawings. It is obvious that by turning the crank handled rods 30 in the proper direction, the hooks 28 on the sections 27 of said rods will cause the axle 16 to be drawn rearwardly so as to press the tires of the wheels 15 against the pulleys 23 to the degree desired.

The driving shaft 21 of the apparatus, has mounted thereon, near one of its ends, a sprocket wheel 32 on one end of the hub 33 of which is mounted a single band brake of a contracting type, which is designated as a whole by the reference numeral 34, which surrounds the hub 33, and has one of its ends secured to the bar 17 by a bolt 36 and its other end or arm 37 extended upwardly some distance above the top of the bar 17, as is clearly shown in Figs. 4 and 5 of the drawings. The arm 37 of the brake member 34 is provided with an opening 28 through which the bolt 36 freely passes, so as to allow of some movement of said arm. Horizontally mounted on the bar 17 is an eccentric 39, which has a handle 40 for turning the same, which eccentric and handle are used for applying the brake to the hub 33 of the bracket wheel 32 under certain conditions. The opposite end of the hub 33 of the sprocket wheel 32 has mounted thereon a clutch-face 41 to engage a clutch 42, slidably mounted on the shaft 21, but fastened thereto by a spline, for sliding movement. The bar or rail 17 is provided near one of its ends with a depending bracket 40, on which is fulcrumed the shorter arm 45 of a bell-crank-lever, the longer arm 46 of which is laterally and horizontally extended over the bar 17 and to one side of the main frame. The shorter arm 45 of this bell-crank-lever has at its lower end a yoke 47 which engages a groove 48 in the clutch member 42, so as to allow of rotation of said member, yet so as to cause it to be slid back and forth on the shaft 21, by the movement of the bell-crank lever. As is clearly shown in Figs. 3 to 5 inclusive, the longer arm 46 of the bell-crank-lever has one of its sides beveled to contact with the upper portion of the arm 37 of the brake 34 as best shown in Fig. 5. Extended horizontally from the bar 17 at one side of the supporting frame is a rod or bar 49, which has its outer end free and is located a slight distance below the longer arm 46 of the bell-crank or clutch control lever, which lever is provided near its outer end with a stop 50 to restrict the outward movement of a link 51, which is provided with a slot 52, to receive the arm 46 of said lever. The link 51 is also provided with an opening below said slot to receive the outer end of the rod or bar 49, which will normally hold the link 51 with the upper end of its slot 52, slightly above the arm 46 of said lever. The link 51 supports a weight 53 and extended rearwardly from the bracket 18, adjacent to the weight 53, is an arm 54, on which is fulcrumed one arm 55 of a trip or bell-crank-lever, the other arm 56 of which is extended forwardly and around the outer portion of the rod or bar 49, as is clearly shown in Fig. 3 of the drawings.

The inner portion of the arm 55 is bent downwardly and then horizontally and is formed with a pair of prongs 57 and 58 which stride the cable 59, which is attached at one of its ends to a windlass or drum 60, which is loosely mounted on the shaft 20, which, as before stated, is journaled on the brackets 18 of the end pieces 10 of the main frame. Keyed to the shaft 20, in alinement with the sprocket wheel 32, is a sprocket wheel 61, which is connected to the sprocket wheel 32 by a chain 62, as is best shown in Fig. 2 of the drawings. The hub of the wheel 61, on the side of said wheel, adjacent to the drum, is provided with an annular groove 63, to receive one end of a collar 64, which surrounds said hub and also the hub of the drum 60, which is also provided with an annular groove 65, for the reception of the other end of said collar. The opposite end of the drum 60 is provided with a clutch face 66, to be engaged by the teeth of a clutch 67, keyed to the shaft 20 for sliding movement thereon. The clutch member 67 is provided with a groove 68 to receive a yoke 69 on the end of a lever 70, which is fulcrumed on an arm 71, secured to one of the brackets 18 of the main frame. By moving the lever 70 in the proper direction, it is obvious that the clutch member 67 will be thrown in or out of gear with the clutch face 66, so as to cause the drum 60 to turn with the shaft 20. The cable 59 has adjustably mounted thereon a stop collar 72, which can be so located on the cable that it will strike the prongs 57 and 58 of the trip lever at the time it is desired to stop the operation of the drum, for it is apparent that as the cable is wound up on the drum, the collar 72 will be drawn toward the latter and forced against the said prongs, which will force the arm 55 of the trip lever toward the drum and the arm 56 of said lever outwardly, thus releasing the link 51 from the arm 49, so that the weighted link will depress the lever 46, thus throwing the clutch member 42 out of engagement with the clutch member 41 on the hub of the sprocket wheel 32, and at the same time, the beveled portion of the lever 46 will contact with the arm 37 of the brake 34, so as to cause said brake to be tightened on the hub of said sprocket wheel, which is keyed to the shaft 21, as shown. To again start the machine, the weighted link 51 should be raised and placed in position on the end of the rod 49 and the lever 46 raised to about a horizontal position, when it is obvious that the clutch member 42 on the shaft 21 will be thrown into engagement with the clutch member 41 on the hub of the sprocket wheel 32, thus transmitting power through the chain 62 and sprocket wheel 61, to the shaft on which the drum is mounted. If it is desired to apply the brake 34 other than by means of the trip lever, it is obvious that the eccentric 39 can be turned by means of its handle 40, so as to actuate the arm 37 of said brake in the proper direction. In Figs. 8 and 9 of the drawings is shown a protecting block for the truss rods of automobiles on that class of such machines which have truss-rods, when said machines are backed up on the inclined rails or tracks 12, and said block consists of a piece 73, which is provided in its upper surface with a groove 74 to receive the axle 75 of the vehicle, and in its lower portion an inclined groove 76 to receive the truss rod 77, as is clearly shown in Fig. 9 of the drawings. By this means it is apparent that the block or piece 73 will rest on the rail or track 12, thus protecting said rod.

Having thus fully described my invention, what I claim as new and desire to secure by Letters-Patent is—

1. In a power transmitting apparatus, the combination with a supporting frame having means for supporting the rear axle of a motor-driven vehicle with its wheels from the ground, of a shaft transversely journaled on the frame in parallelism with the axle of the vehicle, one or more pulleys mounted on said shaft to contact with one or more of the wheels of the vehicle, another shaft journaled on the frame in parallelism with the first named shaft and geared thereto and a clutch mechanism mounted on the first named shaft for supplying or shutting off power to the last named shaft.

2. In a power transmitting apparatus, the combination with a supporting frame having inclined rails or tracks for raising and supporting the rear axle of a motor driven vehicle with its wheels from the ground, of a shaft transversely journaled on the frame in parallelism with the axle of the vehicle, one or more pulleys on said axle to contact with at least one of the wheels of the vehicle, means to hold the axle of the vehicle in a given position on the frame, another shaft journaled on the frame in parallelism with the first named shaft and geared thereto, and a clutch and brake mechanism mounted on the first named shaft for supplying or shutting off power to the last named shaft.

3. In a power transmitting apparatus, the combination with a supporting frame, of a shaft horizontally journaled thereon, of means to support the rear axle of a motor driven vehicle on said frame with its wheels from the ground, means on said shaft to frictionally engage at least one of the vehicle wheels, a drum journaled in parallelism with said shaft, and means to operate the drum from the first shaft through independent clutches.

4. In an automobile transmitting apparatus, the combination with a supporting frame, of a driven shaft journaled thereon, a second shaft journaled in parallelism with the first named shaft and geared thereto, an automatic clutch, and an independent manually operated hand clutch and a drum for engagement therewith on the last named shaft.

5. In a power transmitting apparatus, the combination with a main frame having at each side thereof a forwardly inclined rail, of a driving shaft horizontally and transversely journaled on the frame, a pulley on said shaft, means on the frame to hold the axle of a motor driven vehicle in a given position on said rails substantially parallel with respect to said shaft and its pulley, a driven-shaft journaled on said frame in parallelism with the driving-shaft and geared thereto, a drum mounted on the driven shaft, and means operated by the rotation of said drum to stop the same.

6. In a power transmitting apparatus, the combination with a main frame having at each side thereof a forwardly inclined rail, of a driving shaft horizontally and transversely journaled on the frame, a pulley on said shaft, means on the frame to hold the axle of a motor driven vehicle in a given position on said rails substantially parallel with respect to said shaft and its pulley, a driven shaft journaled on said frame in parallelism with the driving shaft and geared thereto, a drum loosely mounted on the driven shaft, means operated by the rotation of said drum to automatically stop the same, and clutch means on the shaft of the drum to engage and release the same.

7. In a power transmitting apparatus, the combination with a main frame having at each side thereof a forwardly and downwardly inclined rail, of a driving shaft horizontally journaled on the frame, a pulley on said shaft, means on the frame to hold the axle of a motor driven vehicle in a given position on said rails substantially parallel with respect to said shaft and its pulley, a driven shaft journaled on said frame alongside the driving shaft and geared thereto, a drum mounted on the driven shaft, a clutch member slidably mounted on said driving shaft near the driving gear thereon and adapted to engage the hub of said gear, means to operate said clutch member, and a manually operated clutch member on the driven shaft adapted to engage the drum thereon.

8. In a power transmitting apparatus, the combination with a supporting frame having means to support the rear axle of a motor-driven vehicle with its wheels from the ground, of a shaft transversely journaled on said frame, one or more pulleys on said shaft, means on the frame to hold the axle of the vehicle in a given position on said frame parallel with respect to said shaft, a sprocket wheel on said shaft having a clutch-faced hub, a clutch slidably mounted on the shaft, means to move said clutch into and out of engagement with said clutch-face, another shaft journaled near the first named shaft and geared to the sprocket wheel thereof, and a drum mounted on the second shaft.

9. In a power transmitting apparatus, the combination with a supporting frame having means to support the rear axle of a motor-driven vehicle with its wheels from the ground, of a shaft transversely journaled on said frame, one or more pulleys on said shaft, means on the frame to hold the axle of the vehicle in a given position on said frame parallel with respect to said shaft, a sprocket wheel on said shaft having a clutch-face, another shaft journaled near the first named shaft and geared to the sprocket wheel thereof, and a drum mounted on the second shaft, and a clutch mounted on the last named shaft to engage and release the drum.

CHARLES D. WRIGHT.

Witnesses:
C. C. BRURLY,
J. P. CRAWFORD.